US011502333B2

(12) United States Patent
Mohtadi et al.

(10) Patent No.: US 11,502,333 B2
(45) Date of Patent: *Nov. 15, 2022

(54) METHOD FOR SYNTHESIZING NOVEL SOFT MATERIALS BASED ON BORON COMPOUNDS

(71) Applicant: Toyota Motor Engineering & Manufacturing North America, Inc., Plano, TX (US)

(72) Inventors: Rana Mohtadi, Northville, MI (US); Oscar Tutusaus, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 532 days.

This patent is subject to a terminal disclaimer.

(21) Appl. No.: 16/424,876

(22) Filed: May 29, 2019

(65) Prior Publication Data

US 2020/0381777 A1 Dec. 3, 2020

(51) Int. Cl.
*H01M 10/0564* (2010.01)

(52) U.S. Cl.
CPC .......... *H01M 10/0564* (2013.01); *H01M 2300/0065* (2013.01); *H01M 2300/0091* (2013.01)

(58) Field of Classification Search
CPC ..... H01M 10/0564; H01M 2300/0091; H01M 2300/0065; H01M 2300/0068; H01M 10/26; H01M 10/0562; H01M 10/0565; H01M 2300/0082; Y02E 60/10
See application file for complete search history.

(56) References Cited

U.S. PATENT DOCUMENTS

| 4,201,839 | A | 5/1980 | Johnson et al. | |
|---|---|---|---|---|
| 9,455,473 | B1* | 9/2016 | Mohtadi | H01M 10/054 |
| 2007/0048605 | A1* | 3/2007 | Pez | H01M 10/0567 429/199 |
| 2008/0063945 | A1 | 3/2008 | Ivanov et al. | |
| 2013/0078532 | A1* | 3/2013 | Chen | H01M 10/0567 429/342 |
| 2014/0038061 | A1 | 2/2014 | Mohtadi et al. | |
| 2016/0372786 | A1* | 12/2016 | Udovic, IV | H01M 10/0562 |

FOREIGN PATENT DOCUMENTS

| EP | 1763099 A2 | 3/2007 |
|---|---|---|
| WO | 2017143348 A2 | 8/2017 |

OTHER PUBLICATIONS

Hansen, B. et al., "Metal boranes: Progress and applications", Coordination Chemistry Reviews, 323 (2016) pp. 60-70.

(Continued)

*Primary Examiner* — Kwang Han
(74) *Attorney, Agent, or Firm* — Christopher G. Darrow; Darrow Mustafa PC

(57) ABSTRACT

Soft solid-state electrolyte compositions for secondary electrochemical cell include a metal salt dispersed or doped in a soft solid matrix. Methods for synthesizing the compositions include doping a solid matrix with a metal salt. The matrix includes an organic cation and a first boron cluster anion. Methods for optimizing the electrolytes include construction of electrolyte libraries and screening of the libraries for a desired property.

15 Claims, 3 Drawing Sheets

(56) References Cited

OTHER PUBLICATIONS

Iranipour, N. et al., "Effect of secondary phase on thermal behaviour and solid-state ion conduction in lithium doped N-ethyl_N_methylpyrrolidinium tetrafluoroborate organic ionic plastic crystal," J. Mater. Checm. A, 2017,5, pp. 24909-24919 (https://pubs.rsc.org/en/content/articlelanding/2017/ta/c7ta08653a#!divAbstract) (Abstract only).

Jin, L. et al., An Organic Ionic Plastic Crystal Electrolyte for Rate Capability and Stability of Ambient Termpature Lithium Batteries, Energy & Environ. Sci., 2014, 7, pp. 3352-3361 (https://pubs.rsc.org/en/content/articlelanding/2014/ee/c4ee01085j#!divAbstract) (Abstract only).

U.S. Appl. No. 16/424,849, filed May 29, 2019.
U.S. Appl. No. 16/425,096, filed May 29, 2019.

\* cited by examiner

METHOD FOR SYNTHESIZING NOVEL SOFT MATERIALS BASED ON BORON COMPOUNDS

TECHNICAL FIELD

The present disclosure relates generally to soft solid electrolytes for use in secondary batteries, and to boron cluster chemistry.

BACKGROUND

Solid-state electrolytes provide many advantages in secondary battery design, including mechanical stability, no volatility, and ease of construction. Existing inorganic solid-state electrolytes displaying high ionic conductivity are usually hard materials that fail to maintain appreciable contact with the electrode materials through battery cycling. Organic solid-state electrolytes, like polymers, overcome the latter issue due to their reduced hardness; however, these suffer from poor ionic conductivity.

Those solid-state electrolytes having appreciable ionic conductivity are generally based on organic ionic liquid crystals (OIPCs). These materials depend on a solid-solid phase transition to achieve high conductivity. OIPC-based materials can suffer from difficulties, including low melting points and/or low temperature windows of the conducting phase that limit their applicability.

Thus, it would be desirable to provide improved solid-state electrolytes that rival the conductivity of OIPC-based electrolytes but do not rely on a phase transition with its attendant limitations. It would further be desirable to provide improved methods for synthesizing and optimizing such materials.

SUMMARY

Methods for synthesizing and optimizing soft solid electrolytes for secondary batteries are provided.

In one aspect, a method for synthesizing a solid electrolyte composition for use in a secondary battery is disclosed. The method includes a step of doping a soft solid matrix with a metal salt. The soft solid matrix has the formula $G_pA$, wherein G is an organic cation from among a list of possible cations disclosed herein, p is 1 or 2; and A is a boron cluster anion. The metal salt has a metal cation and a metal salt anion.

In other aspects, the disclosure provides a method for optimizing a soft electrolyte for use in a secondary electrochemical cell. The method includes a step of providing a library of soft electrolytes, each individual soft electrolyte in the library as described above. The method further includes steps of screening the library of soft electrolytes for a desired property; and selecting a soft electrolyte based on the screening.

These and other features of the method for forming a soft solid electrolyte will become apparent from the following detailed description when read in conjunction with the figures and examples, which are intended to be illustrative and not exclusive.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

Figure 1A:
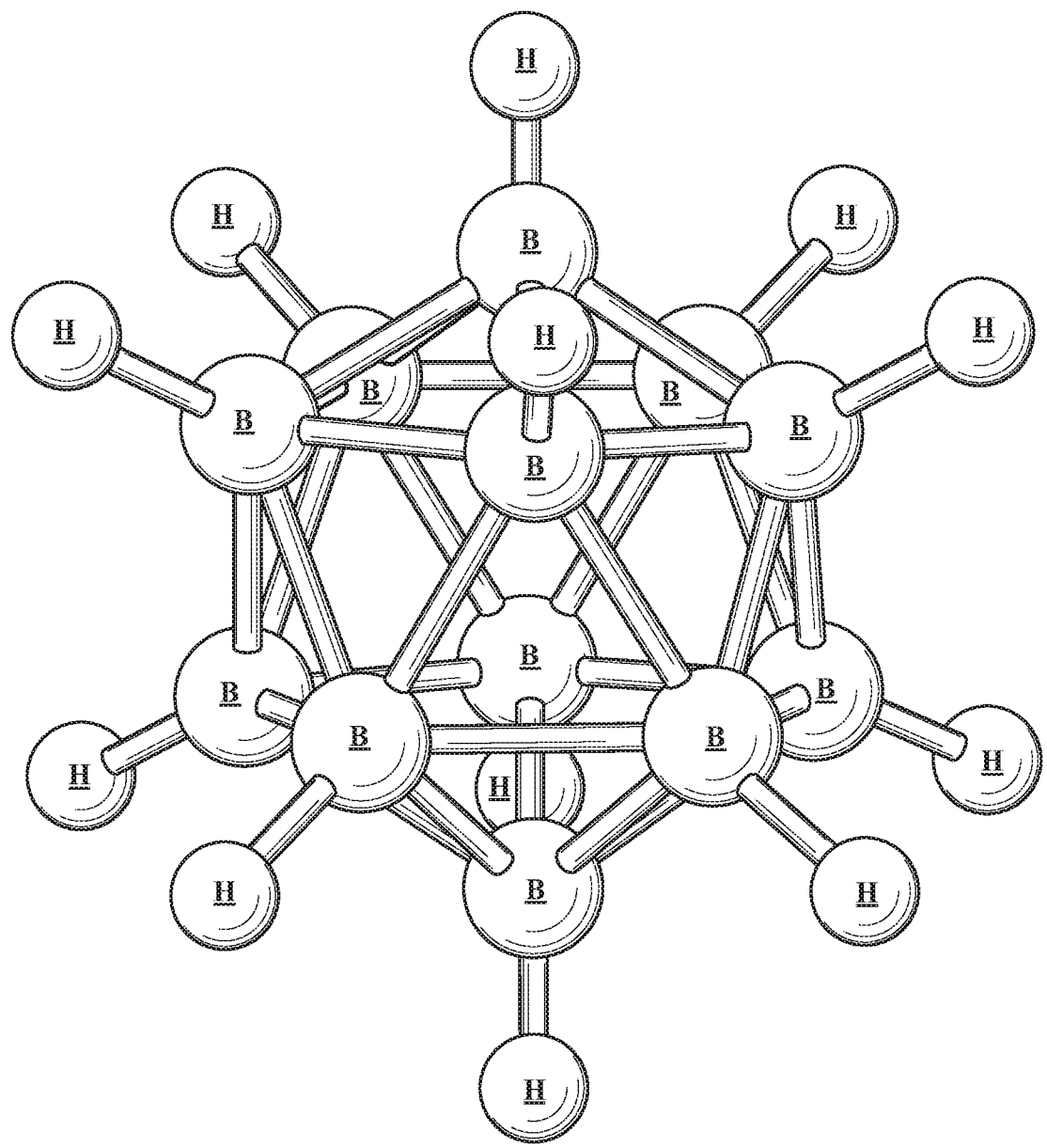
FIG. 1A is a perspective schematic view of a representative boron cluster anion of the present disclosure, closo-$[B_{12}H_{12}]^{2-}$.

The present teachings provide methods for synthesizing and optimizing soft electrolyte compositions having high ionic conductivity in the solid state. The soft electrolyte compositions are typically solid at battery operating temperatures but have unusually high ionic conductivity due to a highly entropic, plastic-like molecular structure.

The methods for synthesis include doping a soft solid matrix with a metal salt. The novel solid matrix includes a boron cluster anion and an organic cation having flexible and/or asymmetrical substituents. The resulting electrolytes form soft solids having a plastic or glass-like, highly entropic molecular structure that yields high ionic mobility and conductivity.

Thus, a soft solid electrolyte composition (referred to hereinafter simply as, "the electrolyte composition") for use in secondary batteries is disclosed. The electrolyte composition includes a solid matrix having a formula $G_pA$, where G is an organic cation, A is a boron cluster anion, and p is either one or two. In some implementations, the organic cation can include at least one of an ammonium and a phosphonium cation, such as the examples shown below as Structures 1-4.

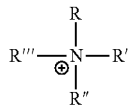

Structure 1

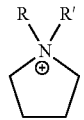

Structure 2

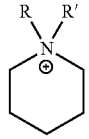

Structure 3

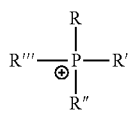

Structure 4 where R, R', and where present R" and R'" is each, independently a substituent belonging to any of: group (i) a linear, branched-chain, or cyclic C1-C8 alkyl or fluoroalkyl group; group (ii) a C6-C9 aryl or fluoroaryl group; group (iii) a linear, branched-chain, or cyclic C1-C8 alkoxy or fluoroalkoxy group; group (iv) a C6-C9 aryloxy or fluoroaryloxy group, group (v) amino; and group (vi) a substituent that includes two or more moieties as defined by any two or more of groups (i)-(v). The substituents R, R', and where present R" and R'" can be alternatively referred to hereinafter as a "plurality of organic substituents. In general, the organic cation will have some degree of asymmetry with respect to the size and distribution of substituents. Thus, at least one of R, R', R" and R'" will be different from the others, and the cation will preferably not include two pairs of substituents.

In certain particular implementations, the organic cation can be selected from the group including: N-methyl-N-propylpyrrolidinium (referred to hereinafter as "Pyr13"); N-methyl-N,N-diethyl-N-propylammonium (N1223); N,N-diethyl-N-methyl-N-(2-methoxyethyl)-ammonium (DEME); N-methyl-N-propylpiperidinium (referred to hereinafter as "Pip13"); N-methyl-N-(2-methoxyethyl)-pyrrolidinium (Pyr12o1); trimethylisopropylphosphonium (P111$_i$4); methyltriethylphosphonium (P1222); methyltributylphosphonium (P1444); N-methyl-N-ethylpyrrolidinium (Pyr12); N-methyl-N-butylpyrroli dinium (Pyr14); N,N,N-triethyl-N-hexyl ammonium (N2226); triethylhexylphosphonium (P2226); and N-ethyl-N,N-dimethyl-N-butylammonium (N4211). It is to be understood that, in some implementations, G can include more than one of the aforementioned cations. It is to be understood that when p equals two, the two organic cations contained in the stoichiometric unit of the solid matrix can be the same cation or can be two different cations.

As used herein, the phrase "boron cluster anion" generally refers to an anionic form of any of the following: a borane having 6-12 boron atoms with a net −2 charge; a carborane having 1 carbon atom and 5-11 boron atoms in the cluster structure with a net −1 charge; a carborane having 2 carbon atoms and 4-10 boron atoms in the cluster structure with a net −1 or −2 charge. In some variations, a boron cluster anion can be unsubstituted, having only hydrogen atoms in addition to the aforementioned. In some variations, a boron cluster anion can be substituted, having: one or more halogens replacing one or more hydrogen atoms; one or more organic substituents replacing one or more hydrogen atoms; or a combination thereof.

In some implementations, the boron cluster anion can be an anion having any formula of:

$[B_yH_{(y-z-i)}R_zX_i]^{2-}$   Anion Formula I, $[CB_{(y-1)}H_{(y-z-i)}R_zX_i]^-$   Anion Formula II, $[C_2B_{(y-2)}H_{(y-t-j-1)}R_tX_j]^-$   Anion Formula III, $[C_2B_{(y-3)}H_{(y-t-j)}R_tX_j]^-$   Anion Formula IV, or $[C_2B_{(y-3)}H_{(y-t-j-1)}R_tX_j]^{2-}$   Anion Formula V, wherein y is an integer within a range of 6 to 12; (z+i) is an integer within a range of 0 to y; (t+j) is an integer within a range of 0 to (y−1); and X is F, Cl, Br, I, or a combination thereof. Substituent R as included in Anion Formulae I-V can be any organic substituent or hydrogen.

It is to be understood that X can be F, Cl, Br, I, or a combination thereof, this indicates that when i is an integer within a range of 2 to y, or j is an integer within a range of 2 to (y−1), this indicates that a plurality of halogen substituents is present. In such a situation, the plurality of halogen substituents can include F, Cl, Br, I, or any combination thereof. For example, a boron cluster anion having three halogen substituents (i.e. where i or j equals 3), the three halogen substituents could be three fluorine substituents; 1 chlorine substituent, 1 bromine substituent, and 1 iodine substituent; or any other combination.

In many implementations, the boron cluster anion can include any of a substituted or unsubstituted closo-boron cluster anion. In some implementations, the boron cluster anion will be a closo-boron cluster anion, such as closo-$[B_6H_6]^{2-}$, closo-$[B_{12}H_{12}]^{2-}$, closo-$[CB_{11}H_{12}]^{2-}$, or closo-$[C_2B10H_{11}]^-$.

Figure 1B:
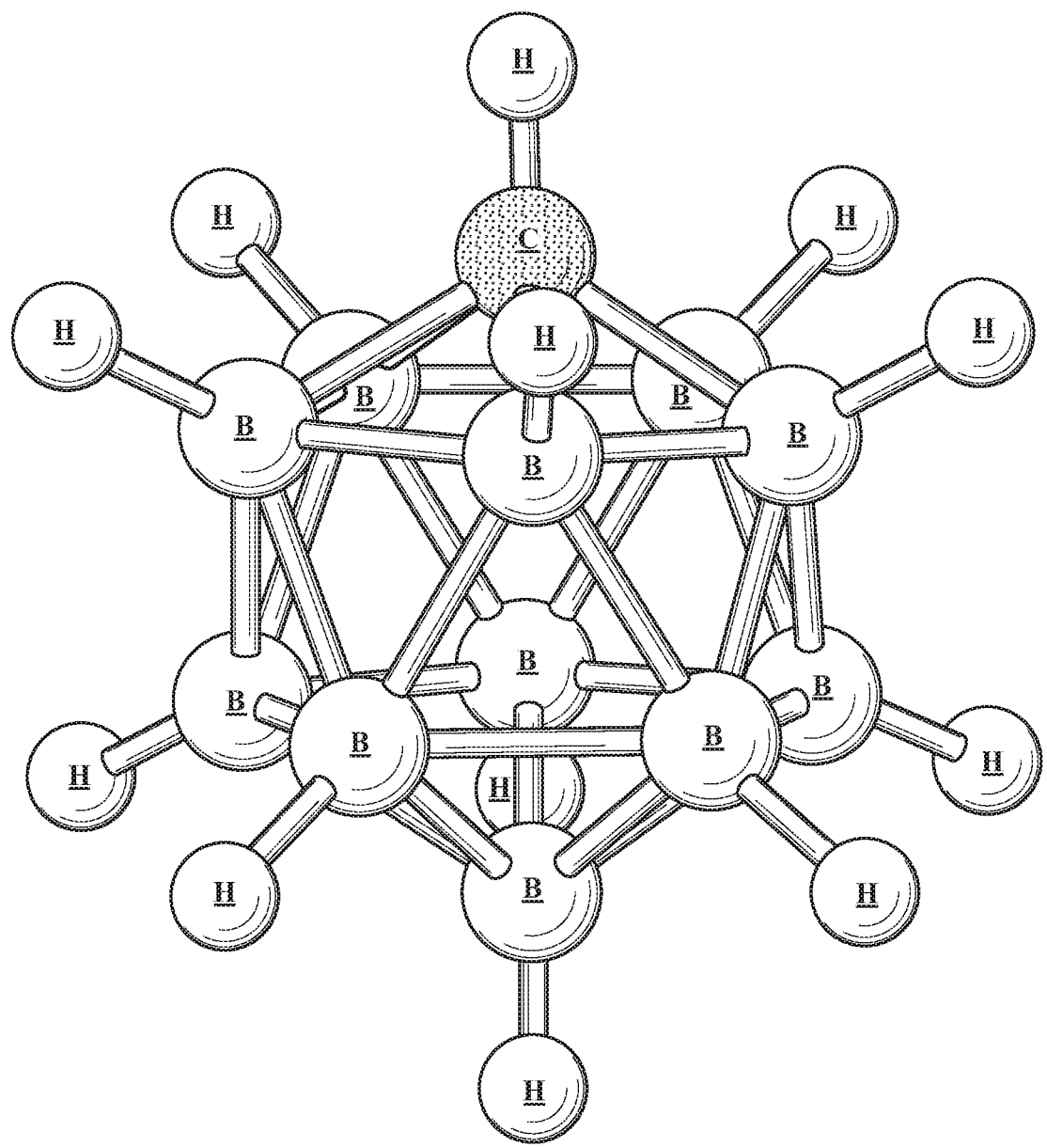
FIG. 1B is a perspective schematic view of a boron cluster anion of the present disclosure, closo-$[C_2B_{10}H_{11}]^-$.
Figure 1C:
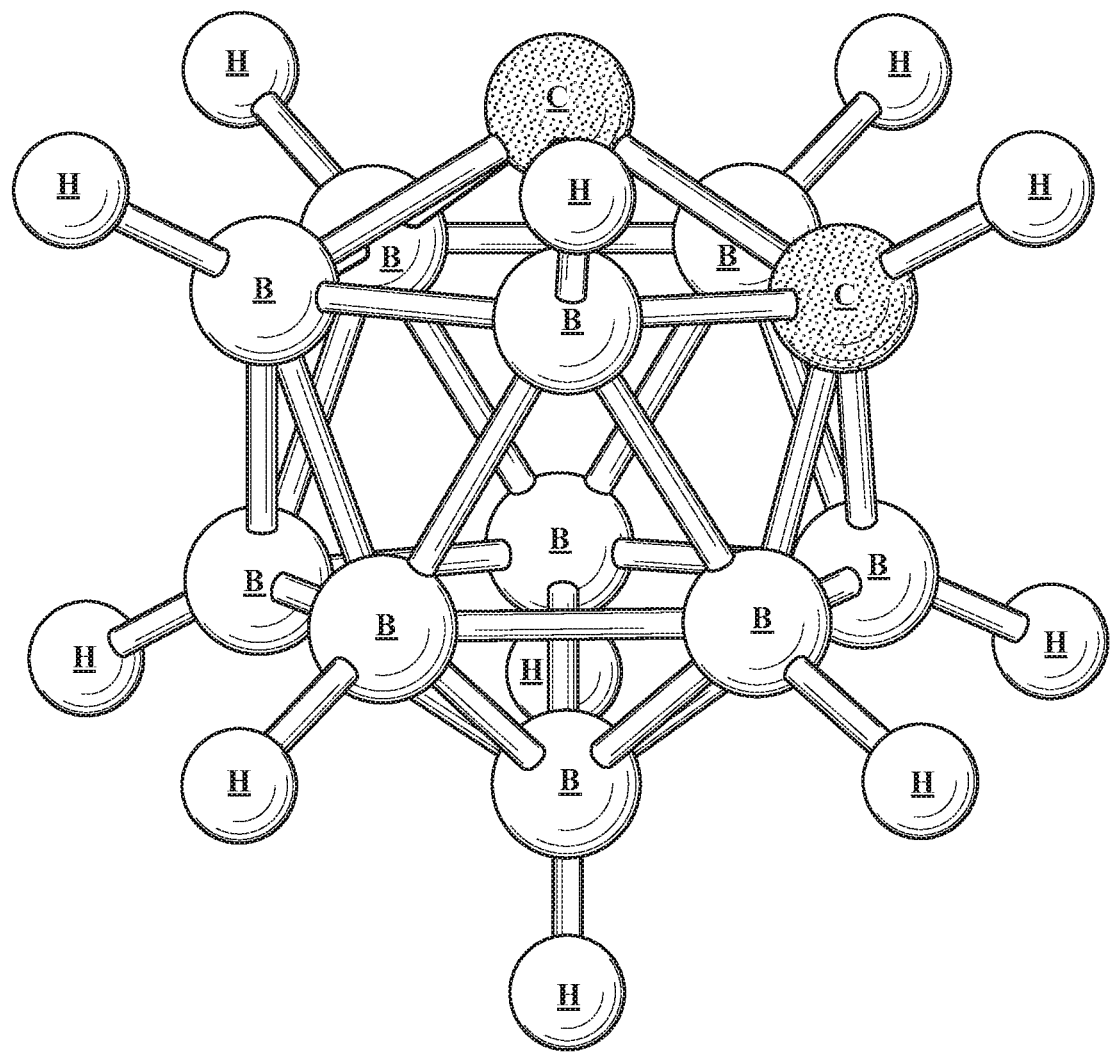
FIG. 1C is a perspective schematic view of a boron cluster anion of the present disclosure, closo-$[C_2B_{10}H_{11}]^-$.

FIGS. 1A-1C show structures of exemplary unsubstituted boron cluster anions according to Anion Formulae I-V, respectively. Specifically, FIGS. 1A-1C show closo-$[B_{12}H_{12}]^{2-}$, closo-$[CB_{11}H_{12}]^-$, closo-$[C_2B_{10}H_{11}]^-$, respectively. The exemplary doso-$[C_2B_{10}H_{11}]^-$ anion of Anion Formula III is shown as a 1,2-dicarba species, however it will be appreciated that such a closo-icosahedral dicarba species can alternatively be 1,7- or 1,12-dicarba. More generally, it is to be understood that the required carbon atoms of Anion Formulae III, IV and V can occupy any possible positions in the boron cluster skeleton. It is also to be understood that non-hydrogen substituents, when present on a boron cluster anion, can be attached at any position in the boron cluster skeleton, including at vertices occupied by either boron or carbon, where applicable.

In some implementations, the electrolyte composition exhibits no phase transition below 80° C. and at standard pressure, as determined by DSC.

In some implementations, the electrolyte composition exhibits ionic conductivity greater than $10^{-10}$ S/cm in the solid state. It will additionally be noted that soft solid electrolytes of the present teachings are substantially softer than most current state-of-the-art solid electrolytes. For example, the elastic modulus of a typical sulfide solid state electrolyte is approximately 26 gigapascals (GPa). In contrast, a soft solid electrolyte having a solid matrix of Pyr14:CB$_9$H10 with 80% metal salt consisting of a 1:1 molar ratio of LiCB$_9$H$_{10}$:LiCB$_{11}$H$_{12}$ has hardness of only 0.214 GPa. Similarly, a soft solid electrolyte having a solid matrix of Pyr14:CB$_{11}$H$_{12}$ with 45% LiCB$_{11}$H$_{12}$ metal salt has elastic modulus (a measure of hardness) of only 2.36 GPa. Thus, in various implementations, the electrolyte composition can have elastic modulus less than about 10 GPa, or less than about 1 GPa, or less than about 0.5 GPa.

The electrolyte composition also includes a metal salt having a metal cation and anion. The anion associated with and/or derived from the metal salt can be referred to hereinafter as "the metal salt anion." The metal salt will generally be selected on the basis of the electrochemistry of the battery in which the electrolyte composition will be used. In different variations, the metal cation can be Lit, Nat, $Mg^{2+}$, $Ca^{2+}$, or any other electrochemically suitable cation.

In some implementations, the anion of the metal salt can be any boron cluster anion of the types described above. In some such implementations of the electrolyte, the boron cluster anion of the metal salt can be the same as the boron cluster anion of the soft solid electrolyte, and in some implementations, the two boron cluster anions can be different. In other variations, the metal salt anion can be any anion suitable for use in battery chemistry, such as TFSI, $BF_4$, $PF_6$, or FSI.

The solid matrix will generally be doped with the metal salt to form the electrolyte composition. Doping can be performed by attaining intimate contact between solid matrix and doping salt. One method to achieve this is to dissolve the dopant salt in the molten organic salt matrix (melt infusion). Another method is by dissolving all components in a solvent, mixing and removing the solvent to yield a solid material. Note that conditioning of the material using hand milling or ball milling prior or after melt infusion can be applied.

In some implementations, the electrolyte composition will include metal salt present at a molar ratio, relative to solid matrix, within a range of about 1:100 to about 100:1. More preferably, in some implementations, the electrolyte composition will include metal salt present at a molar ratio, relative to solid matrix, within a range of about 5:100 to about 1:1.

Thus a method for synthesizing a soft solid electrolyte for a secondary battery is disclosed. The method can include a step of doping a solid matrix with a metal salt to produce a solid electrolyte mixture. The solid matrix and metal salt are as described above. The doping step can be performed, for example by mixing the solid matrix and metal salt at a temperature that meets or exceeds the melting temperature of the solid matrix. In an alternative example, the doping step can be performed by dissolving the solid matrix and metal salt in a solvent system, and removing the solvent.

In alternative and overlapping embodiments, the present teachings include methods for optimizing a soft electrolyte for use in an electrochemical cell. The method for optimizing a soft electrolyte includes a step of providing a library of soft electrolytes, each individual soft electrolyte in the library being as described above in all particulars. Preferably, each soft electrolyte in the library of soft electrolytes will be compositionally unique within the library. Thus, the library of soft electrolytes can contain variations in the identity of the organic cation, the identity of the boron cluster anion, the identity of the metal cation, the identity of the metal salt anion, the molar ratio of matrix to metal salt, or any combination of these parameters. In many implementations, all members of the library will have the same metal cation. In certain implementations, library of soft electrolytes can include variations in the identity of the organic cation, and the individual soft electrolytes in the library can be identical to one another in all respects.

In different variations, the electrolytes in the soft electrolyte library can be synthesized as described above, either manually or via high-throughput combinatorial synthetic techniques. Thus, in certain implementations, a library of soft matrices can first be synthesized by combining one or more boron clusters with a variety of organic cations. The library of soft matrices can then be doped with one or more metal salts, as described above.

The method for optimizing a soft electrolyte can include a step of screening the library of soft electrolytes for a desired property. For example, ionic conductivity, ion transference, or a mechanical property such as softness can be measured for each soft electrolyte in the library. Alternatively or in addition, each soft electrolyte in the library can be incorporated into an electrochemical cell and tested for a desired electrochemical property, such as multi-cycle stability, power density, or any other desired property. Typically, the electrochemical cells that the soft electrolytes of the library are incorporated into will be identical in all respects (e.g. anode, cathode, etc.) except for the identity of the electrolyte.

The method for optimizing a soft electrolyte can then include a step of selecting a soft electrolyte based on the screening. Thus, for example, the method for optimizing a soft electrolyte can be directed to optimizing the soft electrolyte for a given electrochemistry (e.g. Li, Na, Mg, Ca, dual-ion, or any other secondary battery type). If, for example, an optimal soft electrolyte is known for a Li-ion battery, and one is desired for a sodium battery, the optimized Li-ion electrolyte may be used as a starting point for library design. In a particular example, a soft matrix library can be designed that includes the same boron cluster anion as that of the optimized Li-ion electrolyte, but varies the organic cation. The soft matrix library can then be doped with a metal salt that is identical to that of the optimized Li-ion electrolyte, but with Na replacing Li+ in the metal salt. In this way, the method for optimizing the soft electrolyte will explore and optimize organic cation identity for a Na battery.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A method for synthesizing an electrolyte composition for a secondary electrochemical cell, the method comprising:

doping a solid matrix with a metal salt by mixing the solid matrix and the metal salt at a temperature that meets or exceeds the melting temperature of the solid matrix such that the metal salt is dissolved in a molten salt matrix, then cooling the molten salt matrix with the dissolved metal salt such that a solid electrolyte mixture is produced, the solid matrix having the formula $G_pA$, wherein:

G is an organic cation selected from the group consisting of:
  ammonium and phosphonium, having a plurality of organic substituents, each organic substituent of the plurality of organic substituents is independently selected from the group consisting of:
    (i) a linear, branched, or cyclic C1-C8 alkyl or fluoroalkyl group;
    (ii) a C6-C9 aryl or fluoroaryl group;
    (iii) a linear, branched-chain, or cyclic C1-C8 alkoxy or fluoroalkoxy group;
    (iv) a C6-C9 aryloxy or fluoroaryloxy group;
    (v) amino; and
    (vi) a substituent that combines two or more of (i)-(v);
  wherein at least one organic substituent of the plurality of organic substituents differs from at least one other organic substituent of the plurality of organic substituents;
p is 1 or 2;
A is a boron cluster anion; and
the metal salt comprises a metal cation and an anion.

2. The method as recited in claim 1, wherein the boron cluster anion, A, has a formula of one of $[B_yH_{(y-z-i)}R_zX_i]^{2-}$, $[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-t-j)}R_tX_j]^-$, and $[C_2B_{(y-3)}H_{(y-t-j-1)}R_tX_j]^{2-}$, and wherein:
  y is an integer within a range of 6 to 12;
  (z+i) is an integer within a range of 0 to y;
  (t+j) is an integer within a range of 0 to (y−1);
  X is F, Cl, Br, I, or a combination thereof; and
  R comprises any of a linear, branched-chain, or cyclic C1-C18 alkyl or fluoroalkyl group; an alkoxy or fluoroalkoxy; and a combination thereof.

3. The method as recited in claim 2, wherein the boron cluster anion, A, comprises at least one of closo-$[B_6H_6]^{2-}$, closo-$[B_{12}H_{12}]^{2-}$, closo-$[CB_{11}H_{12}]^-$, and closo-$[C_2B_{10}H_{11}]^-$.

4. The method as recited in claim 1, wherein the anion of the metal salt comprises a boron cluster anion independent of the boron cluster anion, A, and having a formula of one of $[B_yH_{(y-z-i)}R_zX_i]^{2-}$, $[CB_{(y-1)}H_{(y-z-i)}R_zX_i]^-$, $[C_2B_{(y-2)}H_{(y-t-j-1)}R_tX_j]^-$, $[C_2B_{(y-3)}H_{(y-i-j)}R_tX_j]^-$, and $[C_2B_{(y-3)}H_{(y-t-j-1)}R_tX_j]^{2-}$, and wherein:
  y is an integer within a range of 6 to 12;
  (z+i) is an integer within a range of 0 to y;
  (t+j) is an integer within a range of 0 to (y−1);
  X is F, Cl, Br, I, or a combination thereof; and
  R comprises any of a linear, branched-chain, or cyclic C1-C18 alkyl or fluoroalkyl group; an alkoxy or fluoroalkoxy; and a combination thereof.

5. The method as recited in claim 1, wherein the anion of the metal salt comprises at least one of: (fluorosulfonyl) imide (FSI); bis(trifluoromethanesulfonyl)imide (TFSI); hexafluorophosphate; and tetrafluoroborate.

6. The method as recited in claim 1, wherein the metal cation is selected from the group consisting of $Li^+$, $Na^+$, $Mg^{2+}$, $Ca^{2+}$.

7. The method as recited in claim 1, wherein the metal salt comprises $Li(CB_{11}H_{12})$.

8. The method as recited in claim 1, wherein G comprises an ammonium cation.

9. The method as recited in claim 1, wherein G comprises a phosphonium cation.

10. The method as recited in claim 1, wherein the metal salt is homogeneously distributed throughout the solid matrix.

11. The method as recited in claim 1, wherein the metal salt is present at a molar ratio, relative to the solid matrix, within a range of from about 1:100 to 100:1, inclusive.

12. The method as recited in claim 1, wherein the metal salt is present at a molar ratio, relative to the solid matrix, within a range of from about 0.5:1 to 1:1, inclusive.

13. The method as recited in claim 1, wherein the solid matrix comprises at least two organic cations.

14. The method as recited in claim 1, wherein the solid electrolyte mixture has an elastic modulus less than 10 GPa.

15. The method as recited in claim 1, wherein the solid electrolyte mixture has an elastic modulus less than 1.0 GPa.

* * * * *